Aug. 17, 1954  J. V. NIIRANEN  2,686,374
SYNTHETIC ARM
Filed Jan. 31, 1952  2 Sheets-Sheet 1

INVENTOR
JOHN V. NIIRANEN
BY
ATTORNEY

Aug. 17, 1954

J. V. NIIRANEN 2,686,374

SYNTHETIC ARM

Filed Jan. 31, 1952

INVENTOR

JOHN V. NIIRANEN

BY

*D. C. Snyder*

ATTORNEY

Patented Aug. 17, 1954

2,686,374

UNITED STATES PATENT OFFICE 2,686,374

SYNTHETIC ARM

John V. Niiranen, Bethesda, Md.

Application January 31, 1952, Serial No. 269,319

3 Claims. (Cl. 35—17)

(Granted under Title 35, U. S. Code (1952), sec. 266)

The invention described herein may be manufactured and used by or for the Government of the United States of America for governmental purposes without the payment of any royalties thereon or therefor.

This invention relates to a new and improved device for training doctors, nurses and medical technicians, in the techniques of needle insertion, intravenous injection and blood withdrawal.

The particular embodiment of the present invention, which is illustrated in the drawings and described hereinafter in greater detail, comprises generally, a body shaped to simulate a portion of the human anatomy, a skin-like covering for said body and fluid passageways underlying said covering to simulate veins and arteries.

A principal object of the present invention is to provide a simple and efficient device for training medical personnel in the technique of needle insertion.

Another object of the present invention is to provide a simulated portion of the anatomy for the more realistic practice of hypodermic needle injection.

Still another object of the present invention is to provide a medical training device having the advantages mentioned above and which includes a body member shaped to simulate a portion of the anatomy, a membrane covering said body member and fluid passage means underlying said membrane to simulate veins and arteries.

Other objects and many of the attendant advantages of this invention will be readily appreciated as the same becomes better understood by reference to the following detailed description when considered in connection with the accompanying drawings wherein.

Figure 1:
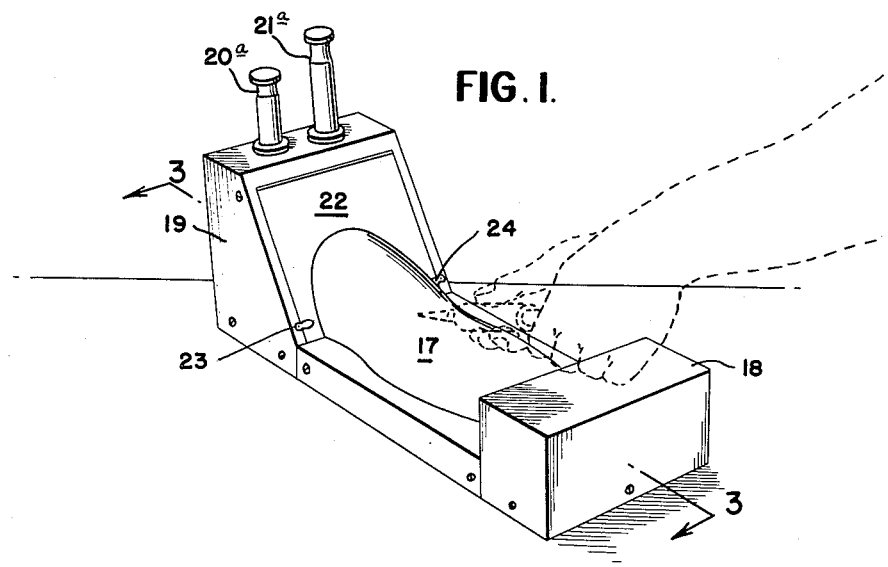
Fig. 1 is a perspective view of a device constructed in accordance with the teachings of the present invention, an operator being shown in dotted lines.
Figure 2:
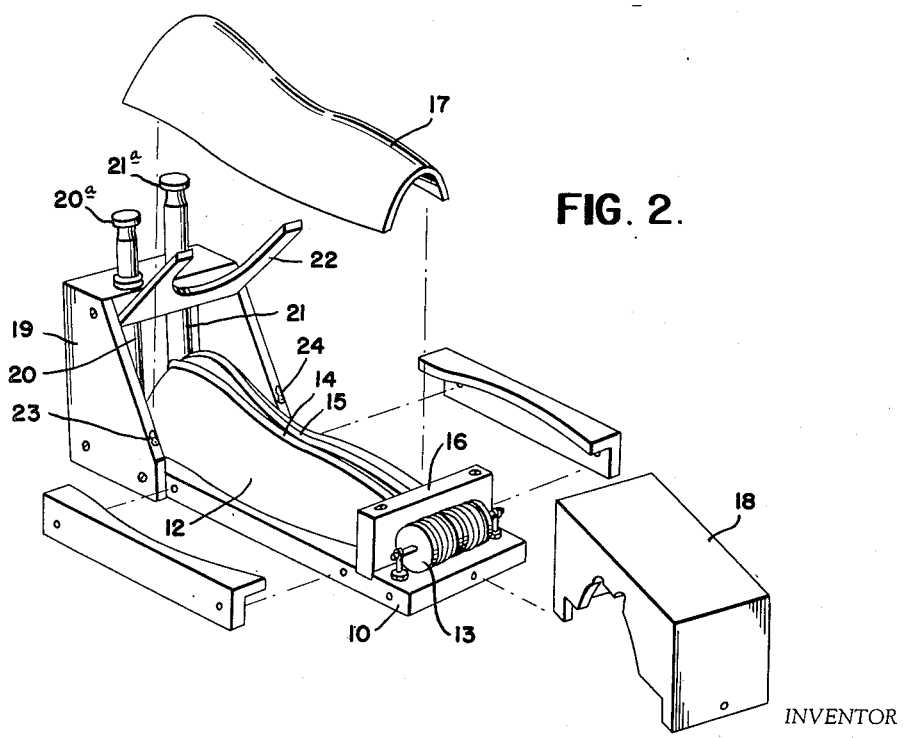
Fig. 2 is an exploded view of the device showing the various parts thereof.
Figure 3:
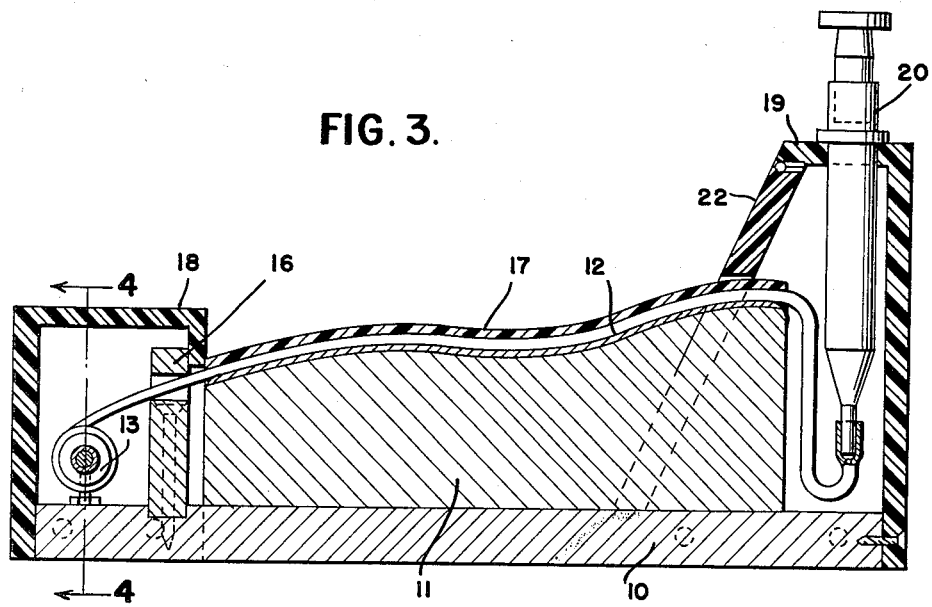
Fig. 3 is a vertical section taken on the line 3—3 of Fig. 1.
Figure 4:
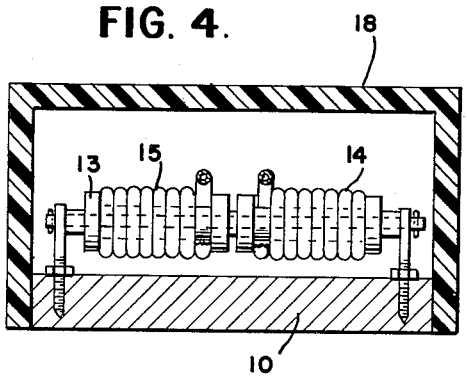
Fig. 4 is a vertical section taken on the line 4—4 of Fig. 3.

Referring now more specifically to the drawings, in which corresponding reference numerals represent corresponding parts in each of the several views, the embodiment of the invention illustrated therein comprises a base 10 in the form of a flat plate adapted to rest upon a horizontal surface. On the base 10 and spaced inwardly from its ends is mounted a body member 11 shaped in the form of a portion of the anatomy, namely, the human forearm. The body member 11 is made of dental stone or other form retaining material and preferably covered with a layer 12 of soft material such as felt, see Fig. 3.

A reel 13 of any suitable construction is mounted on the base 10 adjacent to one end of the body member 11. Coiled upon the reel 13 are flexible conduits 14 and 15 each having one end closed and fabricated of latex or other suitable material. The other end of each of said conduits overlies body member 11 and extends toward and beyond the other end of said body member. Positioned intermediate reel 13, and body member 11 and in bridging relation with respect to said conduits is a guide 16, which guide is fixedly secured to base 10 for maintaining the conduits in proper relation with respect to each other and body member 11.

A skin-like membrane 17 fabricated of vinyl-resin or other suitable material conformably covers body member 11, layer 12 and conduits 14, 15 to form therewith a simulated portion of the human forearm, including veins and arteries.

A housing 18, made of wood, metal or plastic, encloses reel 13 and guide 16 and is fixedly secured to the adjacent end of base 10. A second housing 19 is positioned adjacent the other end of base 10 and fixedly secured thereto. Supported by the housing 19 are a pair of reservoirs or syringes 20, 21 having plungers 20a, 21a movable therein, said syringes having their outlet ends disposed within the housing 19 and each in communication with one of the conduits 14, 15. Wall 22 of housing 19 is hingedly mounted to provide easy access to the interior of the housing, the wall being normally retained in closed position by latches 23, 24. A pair of side members 25 and 26 extend along and are secured to opposite sides of base 10 to retain membrane 17 in proper covering relation with respect to body 11.

In operation, a fluid, preferably colored to simulate blood, is introduced into syringes 20 and 21 and forced into conduits 14 and 15. An operator may then practice insertion of a hypodermic needle through membrane 17 and into one of conduits 14 or 15. After the latex conduits have been punctured so as to prevent further use, they may be disconnected from the syringes and the punctured portion severed to provide a fresh length of conduit for future use. Desirably, the conduits 14 and 15 are fabricated of a self-sealing material such as will permit the indefinite use of said conduits.

Although the present invention has been described in some detail for the purposes of complete understanding, it is understood that certain changes and modifications may be made within the spirit of the invention and scope of the appended claims.

What I claim is:

1. A medical training device comprising a rigid body member; a soft resilient layer covering said rigid body member; a skin-like membrane covering said soft resilient layer; blood vessels underlying said membrane; and said rigid body member, soft resilient layer, skin-like membrane and blood vessels being secured in proper relation to each other by detachable clamping means so that each individual element may be easily detached and replaced when rendered by usage unfit for further use.

2. A medical training device for demonstrating the techniques of needle insertion, intravenous injection and blood withdrawal comprising a rigid body member shaped to simulate the human forearm, a layer of soft resilient material covering said rigid body member, a detachable and expendable skin-like membrane covering said soft resilient material, vein and artery simulating conduits of a length materially in excess of said body member underlying said membrane movable relative to said soft resilient material for positioning successive sections of the conduit in proper relation to said soft resilient material as preceding sections of said conduits are rendered by usage unfit for further use, and a simulated blood-supplying receptacle connected to one end of said conduits having a hand actuated positive pressure means whereby any desired substantially normal blood pressure may be reproduced.

3. A medical training device comprising a rigid body member; a soft resilient layer covering said rigid body member; a skin-like membrane covering said soft resilient layer; blood vessels underlying said membrane, said blood vessels being movable relative to said soft resilient layer; and said rigid body member, soft resilient layer, skin-like membrane and blood vessels being secured in proper relation to each other by detachable clamping means so that each individual element may be easily detached and replaced when rendered by usage unfit for further use.

References Cited in the file of this patent

UNITED STATES PATENTS

| Number | Name | Date |
|---|---|---|
| 2,034,446 | Saxe | Mar. 17, 1936 |
| 2,207,153 | Judovich | July 9, 1940 |
| 2,213,270 | Chase | Sept. 3, 1940 |
| 2,288,296 | Munro | June 30, 1942 |
| 2,324,702 | Hoffmann et al. | July 20, 1943 |